United States Patent
Gray et al.

(10) Patent No.: US 9,880,640 B2
(45) Date of Patent: Jan. 30, 2018

(54) MULTI-DIMENSIONAL INTERFACE

(75) Inventors: Timothy T. Gray, Seattle, WA (US); Robert K. Stein, III, Redmond, WA (US); Jeffrey A. White, Seattle, WA (US); Aaron Michael Donsbach, Seattle, WA (US); Mark R. Privett, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 63 days.

(21) Appl. No.: 13/442,298

(22) Filed: Apr. 9, 2012

(65) Prior Publication Data

US 2013/0091462 A1 Apr. 11, 2013

Related U.S. Application Data

(60) Provisional application No. 61/544,245, filed on Oct. 6, 2011.

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/012* (2013.01); *G06F 3/0482* (2013.01);
(Continued)

(58) Field of Classification Search
CPC .. G06F 3/0482; G06F 3/04815; G06F 3/0483; G06F 3/0488; G06F 3/0346
(Continued)

(56) References Cited

U.S. PATENT DOCUMENTS

| 6,813,146 B2 | 11/2004 | Haraguchi et al. |
| 7,760,995 B2 | 7/2010 | Kokubo |

(Continued)

FOREIGN PATENT DOCUMENTS

| CN | 101673179 | 3/2010 |
| EP | 2166427 | 3/2010 |

(Continued)

OTHER PUBLICATIONS

TheAppleChannelTV, "Apple—Time Machine Basics", Jul. 10, 2010, retrieved from the Internet <URL: http://www.youtube.com/watch?v=RDPzVdohrck/>, p. 1-2.*

(Continued)

*Primary Examiner* — Anil Bhargava
*Assistant Examiner* — Mong-Shune Chung
(74) *Attorney, Agent, or Firm* — Polsinelli LLP

(57) ABSTRACT

A device can display content on a page associated with a dimension. A user can adjust an orientation of the device to adjust a displayed orientation of the page, enabling pages for additional dimensions to be displayed. A user can select one of these dimensions, and adjust an orientation of the device to enable the user to access content for the selected dimension. The change in orientation can be a tilt or flick of the device in a first direction to select a dimension, and then a user could tilt or flick the device in another direction to view pages, sub-dimensions, or other groupings of content among that dimension. Such an approach can enable a user to quickly locate content corresponding to a sub-dimension without having to scroll down a long page of content or otherwise manually navigate to specific content.

18 Claims, 9 Drawing Sheets

(51) Int. Cl.
   *G06F 3/0481* (2013.01)
   *G06F 3/0482* (2013.01)
   *G06F 3/0483* (2013.01)
   *G06F 3/0488* (2013.01)

(52) U.S. Cl.
   CPC ........ *G06F 3/0483* (2013.01); *G06F 3/04815* (2013.01); *G06F 3/0488* (2013.01)

(58) Field of Classification Search
   USPC .......... 715/810, 766, 848; 340/689; 345/173
   See application file for complete search history.

(56) References Cited

U.S. PATENT DOCUMENTS

| | | |
|---|---|---|
| 8,542,110 B2 | 9/2013 | Choi |
| 9,098,248 B2 | 8/2015 | Suzuki et al. |
| 9,201,471 B2 | 12/2015 | Sato et al. |
| 2004/0233160 A1 | 11/2004 | Chincholle |
| 2006/0033762 A1 | 2/2006 | Card et al. |
| 2008/0062141 A1 | 3/2008 | Chandhri |
| 2009/0259975 A1 | 10/2009 | Asai |
| 2009/0303204 A1* | 12/2009 | Nasiri et al. ................ 345/184 |
| 2009/0307633 A1 | 12/2009 | Haughay, Jr. et al. |
| 2010/0060475 A1* | 3/2010 | Choi ........................... 340/689 |
| 2011/0109567 A1 | 5/2011 | Kim |
| 2011/0254792 A1* | 10/2011 | Waters ................. G06F 1/1626 345/173 |
| 2012/0086629 A1* | 4/2012 | Thorn ........................... 345/156 |
| 2012/0159364 A1* | 6/2012 | Hyun ............................ 715/766 |
| 2012/0159472 A1* | 6/2012 | Hong et al. .................... 717/178 |
| 2012/0179965 A1* | 7/2012 | Taylor ........................... 715/705 |
| 2012/0210260 A1* | 8/2012 | Bederson et al. ............. 715/765 |
| 2012/0278756 A1* | 11/2012 | Shah et al. .................... 715/790 |
| 2012/0317515 A1* | 12/2012 | Wang et al. ................... 715/841 |

FOREIGN PATENT DOCUMENTS

| | | |
|---|---|---|
| EP | 2764428 | 8/2014 |
| JP | 2002-164990 | 6/2002 |
| JP | 2009-187426 | 8/2009 |
| JP | 2009-252168 | 10/2009 |
| JP | 2012-058901 | 3/2012 |
| JP | 2012-203768 | 10/2012 |
| WO | WO 2013/052789 | 4/2013 |

OTHER PUBLICATIONS

TrustedReviews, "NetFront Life Browser", Jan. 2011, [retrieved from the Internet on Apr. 3, 2015], <URL http://www.trustedreviews.com/opinions/10-best-android-apps-january-2011_Page-11/>, p. 1-6.*
"Notification of Transmittal of the ISR and the Written Opinion dated Feb. 19, 2013," International Application No. PCT/US12/58935, 9 pages.
"International Written Opinion dated Apr. 5, 2013," International Application No. PCT/US12/58935, 9 pages.
"Notification of IPRP dated Apr. 17, 2014," International Application No. PCT/US12/58935, 6 pages.
Extended European Search Report for European Patent Application EP12838209, dated Oct. 19, 2015, 9 pages.
Partial Supplementary European Search Report for European Patent Application EP12838209, dated Jun. 29, 2015, 5 pages.

* cited by examiner

MULTI-DIMENSIONAL INTERFACE

CROSS-REFERENCE TO RELATED APPLICATIONS

This application claims priority to U.S. Provisional Patent Application No. 61/544,245, filed Oct. 6, 2011, and entitled "MULTI-DIMENSIONAL INTERFACE," which is hereby incorporated herein by reference.

BACKGROUND

Users are increasingly relying upon various electronic and computing devices to store, track, and update various types of information and handle various types of tasks. For example, many users rely upon computing devices to store contact information, user schedules, task lists, and other such information. Unfortunately, the data is often not organized or presented in a way that is intuitive for many users. Further, for portable computing devices such as smart phones or tablet computers, the screen size can be limited such that it can be difficult for a user to locate information due to the size of the various icons or elements with respect to the size of a user's finger.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing and/or displaying data and other types of content on a display element of a computing device. In particular, various embodiments provide the ability to associate data across multiple dimensions, where a dimension generally is a data type, category, or element characterizing a region or portion of a data set or selection of content according to a meaningful separation (e.g., data, group, region, etc.). Dimensions are typically useful for functions such as grouping, sorting, and filtering of a data set. Such approaches can provide for an extended associative memory that enables a user (or application) to locate information using associations that are natural and/or intuitive to that user. Various embodiments also enable an application, user, module, service, or other such entity or component to access, view, search, and otherwise interact with the data across any of the captured and associated dimensions. For example, a user can utilize various different views to locate information that is of interest to the user, in a way that is more intuitive for the user and more closely matches the way the user thinks than conventional list-based approaches.

Various other functions and advantages are described and suggested below as may be provided in accordance with the various embodiments.

Figures 1A, 1B:
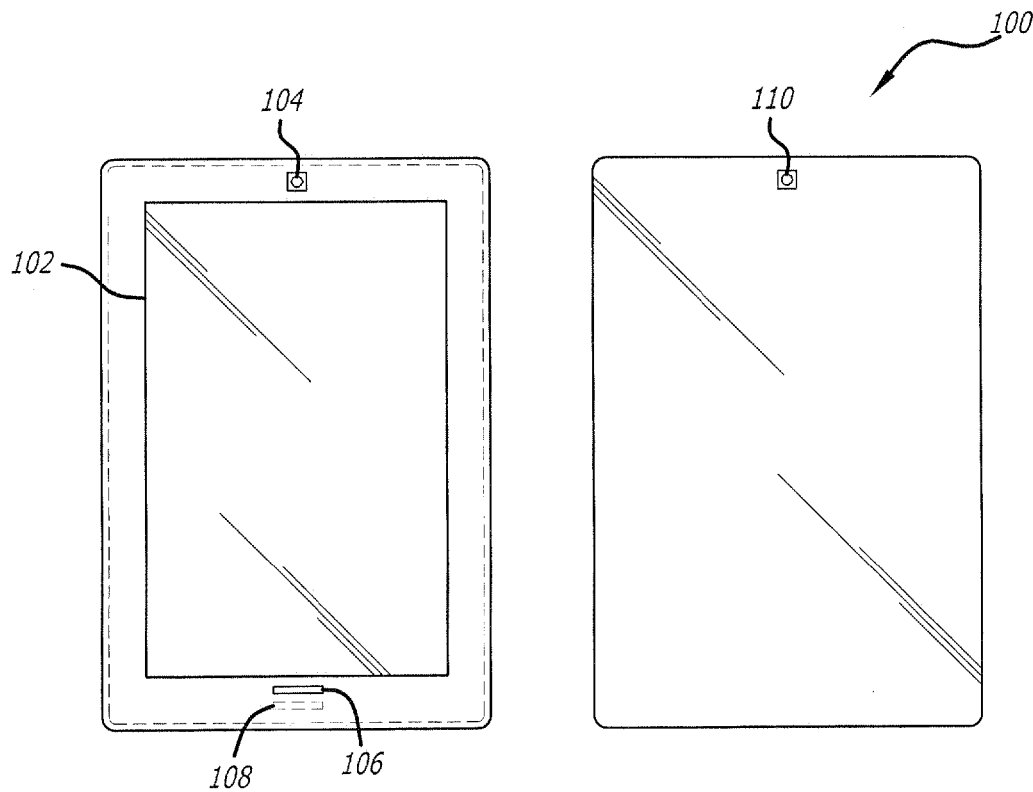
FIG. 1 illustrates front and back views of an example user device that can be utilized in accordance with various embodiments.

FIG. 1 illustrates front and back views, respectively, of an example electronic user device 100 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 100 has a display screen 102 on the front side, which under normal operation will display information to a user facing the display screen (e.g., on the same side of the computing device as the display screen). The computing device in this example includes a front image capture element 104 and a back image capture element 110 positioned on the device such that, with sufficient wide angle lenses or other such optics, the computing device 100 is able to capture image information in substantially any direction about the computing device. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 100 also includes a microphone 106 or other audio capture device capable of capturing audio data, such as words or commands spoken by a user of the device. In this example, a microphone 106 is placed on the same side of the device as the display screen 102, such that the microphone will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. It should be understood, however, that a microphone might be located on any appropriate surface of any region, face, or edge of the device in different embodiments, and that multiple microphones can be used for audio recording and filtering purposes, etc.

The example computing device 100 also includes at least one position and/or orientation determining element 108. Such an element can include, for example, an accelerometer or gyroscope operable to detect an orientation and/or change in orientation of the computing device, as well as small movements of the device. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 2:
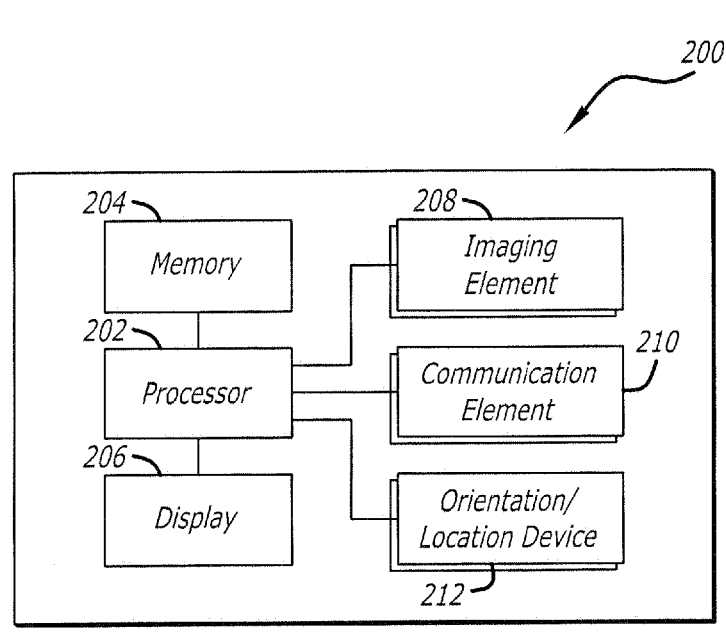
FIG. 2 illustrates example components of a user device that can be utilized in accordance with various embodiments.

FIG. 2 illustrates a logical arrangement of a set of general components of an example computing device 200 such as the device 100 described with respect to FIG. 1. In this example, the device includes a processor 202 for executing instructions that can be stored in a memory device or element 204. As would be apparent to one of ordinary skill in the art, the device can include many types of memory, data storage, or non-transitory computer-readable storage media, such as a first data storage for program instructions for execution by the processor 202, a separate storage for images or data, a removable memory for sharing information with other devices, etc. The device typically will include some type of display element 206, such as a touch screen or liquid crystal display (LCD), although devices such as portable media players might convey information via other means, such as through audio speakers. As discussed, the device in many embodiments will include at least one image capture element 208 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

In some embodiments, the computing device 200 of FIG. 2 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 200 also can include at least one orientation, movement, and/or location determination mechanism 212. As discussed, such a mechanism can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 202, whereby the device can perform any of a number of actions described or suggested herein.

Figure 3A:
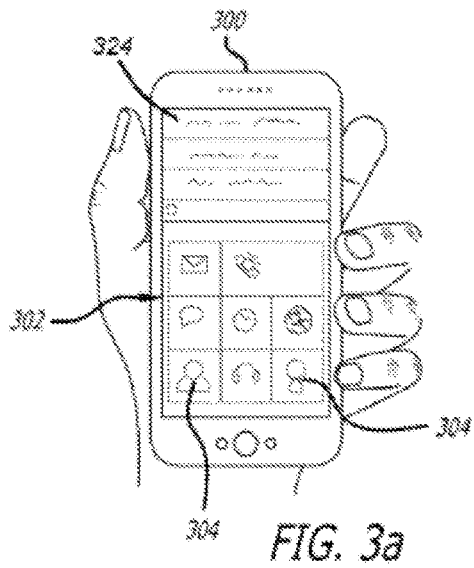
FIGS. 3(a), (b), (c), and (d) illustrate an example operation of an interface that can be provided in accordance with at least one embodiment.
Figure 3B:
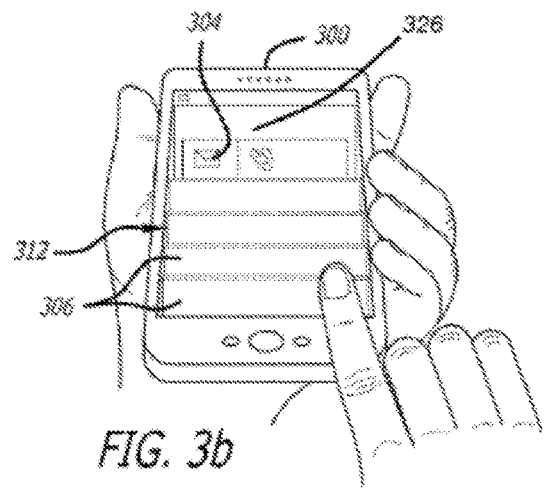

FIGS. 3(a)-3(b) illustrate an example graphical user interface (GUI) on a user device 300 that can be used to enable a user to access information or content across multiple dimensions in accordance with at least one embodiment. In this example, a computing device can receive input from a user, such as a search query or selection of a navigation element. As a result, a display of content 302 is provided, which in this example includes icons for a plurality of different applications and/or services, although various other types of content can be displayed as well as should be apparent. The applications displayed are related to a particular dimension, such as a category of applications, a subset of applications, such as applications starting with the same letter, or a grouping having another such common aspect. The home page 322 could also be a dimension. In FIG. 3(a), the display 302 corresponds to applications or icons 304 that the user has designated as "favorites." Such a display enables the user to access any application having such a designation.

If the user wants to view or select applications for another dimension, the user of a conventional device would typically have to manually search or navigate through the interface to locate that dimension. As illustrated in FIG. 3(b), however, in this embodiment the user can tilt, rotate, translate, flick, or otherwise adjust a relative orientation of the device 300, with respect to the user, to adjust the display of content to provide access to other dimensions or content categories. In this example, the pages 306 (or other screens or groupings of content) act like hanging pages or hanging tile folders 312, which appear to be hanging from a bar at the top of the page. As the device is tilted, for example, the pages "rotate" in a corresponding direction and an animation cascade or collapse together occurs enabling the user to see portions, such as the headings or titles, of multiple pages, or of multiple sections of one large page, on the screen. In this example, the user can see several dimensions 326, including games and shopping related dimensions. In other embodiments, a change in page orientation can refer to any change in the way a content page is presented or looks on the display of a device. In the example above, the change in page orientation refers to the cascading of a content page having multiple categories, content types, or dimensions into a listing of headings of each content type next to each other for navigation.

Figure 3C:
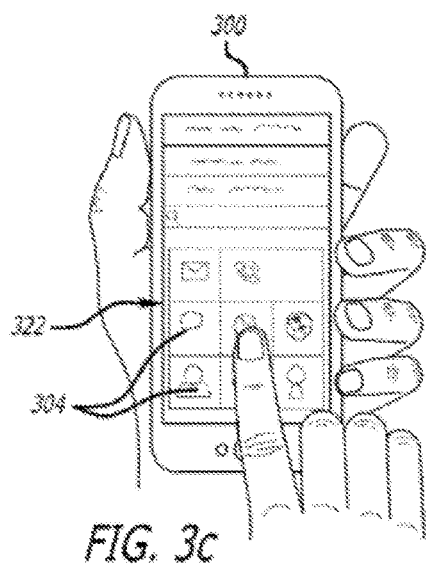

Upon locating a dimension of interest, the user can select that dimension, such as by tapping a touch sensitive display screen at that area, moving to that page using a tab key, translating the device, making a detectable gesture or motion, or performing another such action. In this example, the user selects a "navigation" dimension. As illustrated in FIG. 3(c), the user has selected the navigation dimension and then tilted the device 300 back to the original orientation. As can be seen, the page for the selected dimension rotates accordingly, such that applications for the navigation dimension are displayed to the user. If the user wanted to view content for another dimension, the user could again tilt the device to view the various dimensions, then upon selecting a dimension tilt the device back to access that information.

Figure 3D:
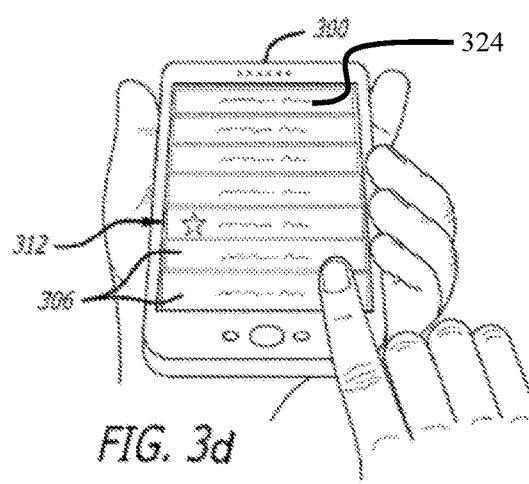

In various embodiments, content is presented on a single page broken up into sections by category. In one instance, as illustrated in FIG. 3(d), the user could flick a portable computing device forward, to collapse the single page only to reveal section titles 324, select a section title to initiate an expansion of the page, and view the content corresponding to the selected section. In another instance, the user could flick the device forward, to collapse the single page into the section titles, select a section title, and flick the device backward to expand the page and view the content corresponding to the selected section. The collapsing and expanding could be represented graphically on a touch screen display of the portable computing device. In a collapsed instance, the page could have the appearance of hanging file folders, a compressed accordion, and the like. In the expanded instance, a user may be able to navigate to other sections of the page by swiping up or down on the touch screen, for example, without providing a flick, tilt, or rotation.

Figure 4A:
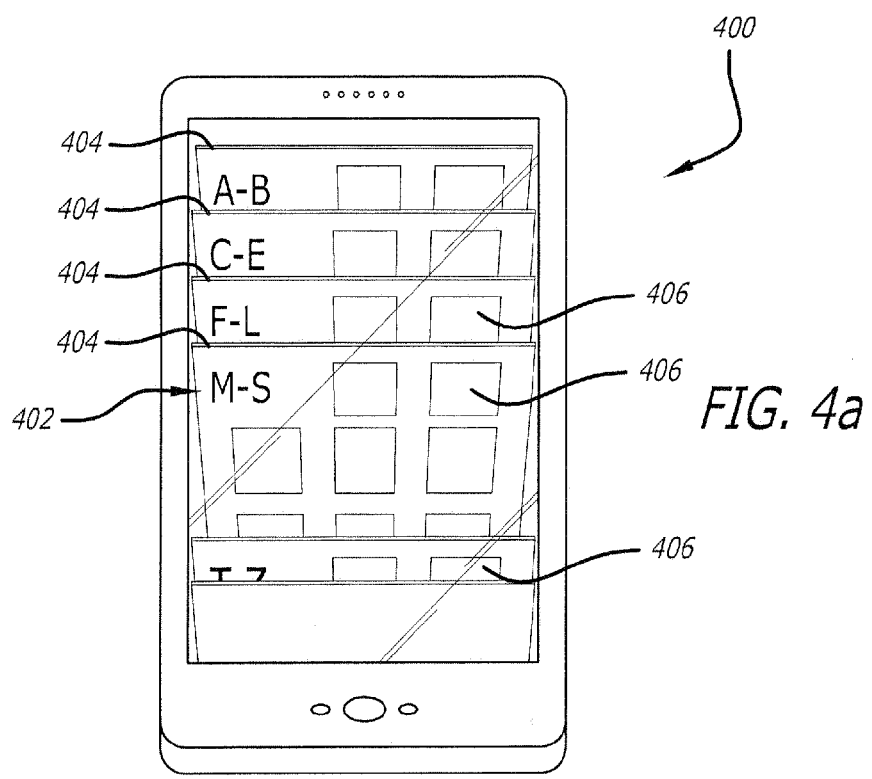
FIGS. 4(a) and 4(b) illustrate another example operation of an interface that can be provided in accordance with at least one embodiment.
Figure 4B:
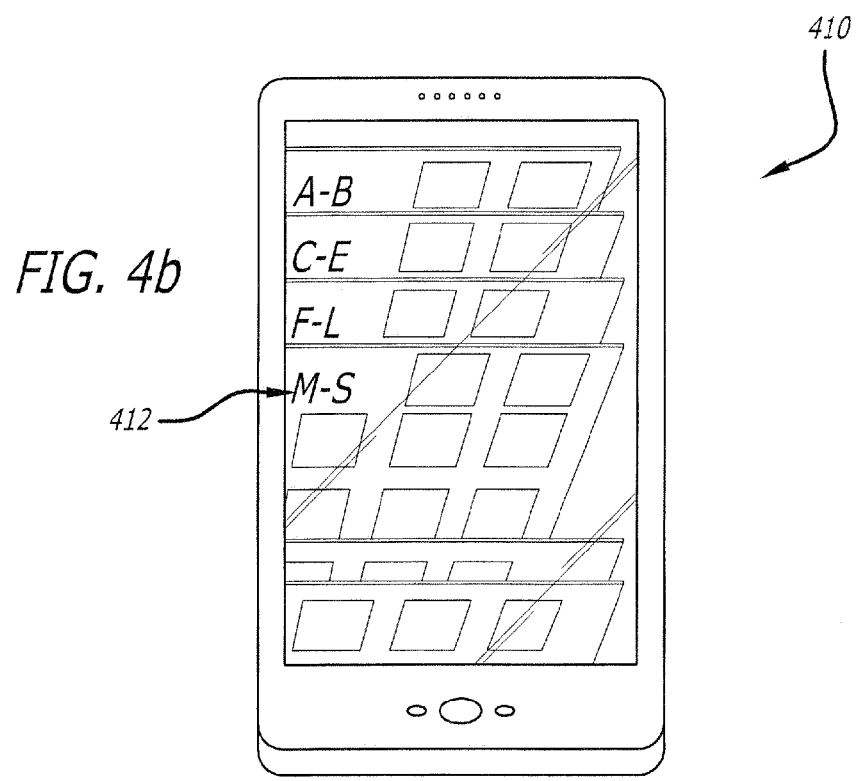

In some embodiments, multiple pages for a dimension can be displayed. For example, FIG. 4(a) illustrates an example display 400 wherein the user has tilted the device to see pages 404 for multiple dimensions, here corresponding to letters of the alphabet for content titles 402. By tilting the device forward, the user can view the various dimensions. As illustrated in FIG. 4(b), however, the user can also tilt the device to the side such that the interface 410 can display multiple pages 404 for a single dimension. In this example, there are multiple pages of application icons 406 associated with the letter grouping (or dimension) "M-S". Accordingly, the user can tilt or flick the device in a first direction to select a dimension, then tilt or flick the device in another direction to view pages, sub-dimensions, or other groupings of content among that dimension. In some embodiments, the user can tilt in multiple dimensions concurrently to more quickly access information. Such an approach can enable a user to quickly locate content corresponding to a sub-dimension without having to scroll down a long page of content or otherwise manually navigate to specific content. In some embodiments, the pages 404 for multiple dimensions could be arranged and displayed to appear in a parallax to give a hint of other content and other pages that are available. In one embodiment, the tilt/flick feature could enable navigation through what appears to be a much larger workspace or canvas UI than the screen of the device. In this embodiment, the multiple pages, applications, dimensions, and so on could be stitched together to provide the appearance of one big page and the tilt, for example, would enable a user to jump to different places or sections within the big page.

In some embodiments, a tilt may be too sensitive a command for accessing certain functions or content because a user may inadvertently initiate or open certain features. This could be inconvenient in some cases, therefore, in such cases, a flick would prove more reliable as a proof positive that the user intends to access the feature or functionality. Relative to a tilt, a flick is a quick back and forth motion in a short window of time, which, depending on a sensitivity threshold, would eliminate inadvertent false positive commands from being passed to the device. There are features where a tilt could prove more convenient and features where a flick could prove more convenient. One such feature where a tilt could prove convenient may include various individual utility icons on a utility bar, for example, where the information is not particularly necessary, and at the same time, not particularly distracting either when inadvertently initiated. For example, a device displaying a first set of utility icons, such as an icon showing battery life, weather, and so on, in a status bar could be swapped out for a second set of utility icons, such as a clock icon and a signal strength icon for phone reception, and so on. However, there could be instances where different users prefer to access features and content differently and one could prefer a tilt where another could prefer a flick, therefore, the above discussion and example is not intended to limit the scope of accessible features and/or content by any particular action.

As discussed elsewhere herein, a device can have one or more elements or components that enable a change in orientation of the device to be determined. In one embodiment, a device can have an orientation-determining element such as an accelerometer, inertial sensor, or electronic gyroscope or compass that can provide input to the device as to an amount and direction of tilt, translation, or other such motion. In other embodiments, a device might use a camera or other such sensor to capture image information and analyze that image information to determine a direction and amount of motion. Various other approaches can be used as well, such as those described in co-pending U.S. patent application Ser. No. 12/950,896, filed Nov. 19, 2010, entitled "Multi-Dimensional Data Association," which is hereby incorporated herein by reference.

In various embodiments, the tilt or flick feature could be used in conjunction with a action that will be referred to herein as a "clutch" in order to enable in-page navigation. For example, a user could navigate to a dimension by using the tilt feature, select an application, and when the clutch is initiated or actuated, enable navigation within the page of the selected application by the same tilt function that allowed the user to navigate to the selected dimension. The clutch could be a button on the side of the device, a voice command, a flick, or any other command or gesture one could make to enable a function with a portable computing device. The clutch can cause the global tilt/flick feature to be translated into a local navigation feature within an application, webpage, or map application, for example. In a map application, for example, a clutch enabled tilt/flick would allow a user to travel north by tilting the top of the device toward the ground, south by tilting the bottom of the device toward the ground, east by tilting the right edge toward the ground, and west by tilting the left edge toward the ground, for example.

The tilt/flick feature could also he used to turn a page when a user is reading an electronic book or magazine on the portable computing device, for example. In this example, a flick could turn a single page and tilting the left side of the device downward could initiate the turning of multiple pages. In one embodiment, the greater the angle of tilt when a user tilts the left side of the device toward the ground could translate into increasing speed or acceleration of page turning. In this embodiment, there could be a first detent for a first page turn speed and a second detent that causes the pages to turn at a faster second page turn speed.

Figure 5A:
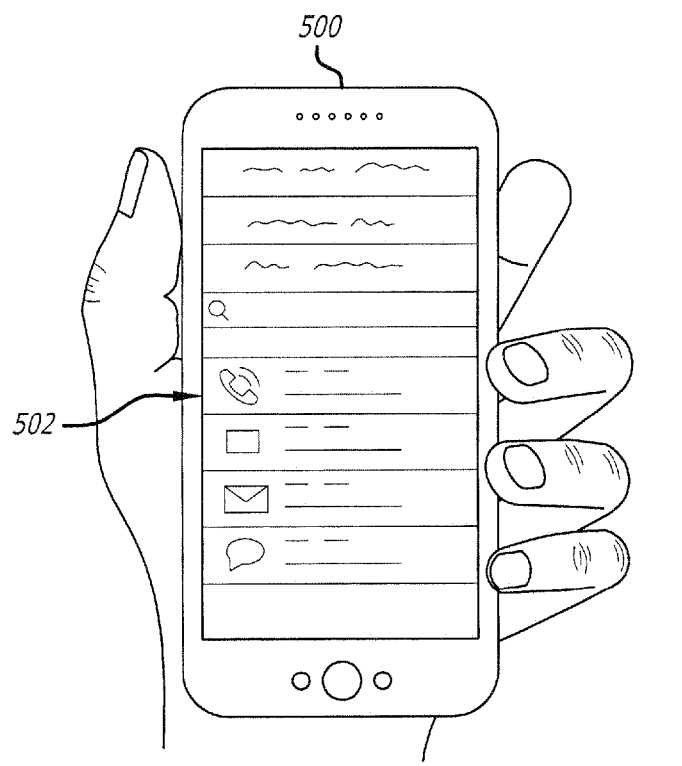
FIGS. 5(a) and 5(b) illustrate another example operation of an interface that can be provided in accordance with at least one embodiment.
Figure 5B:
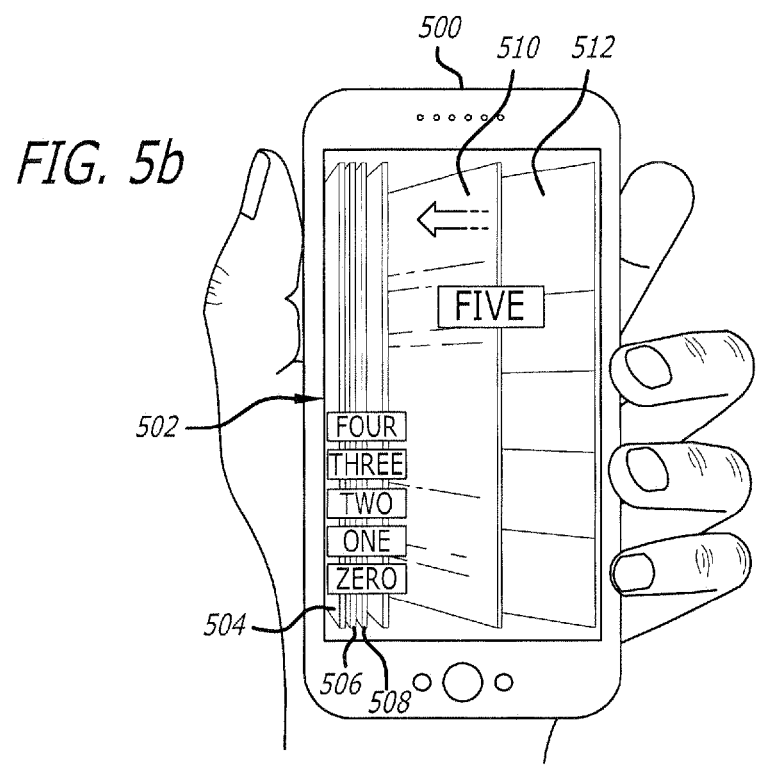

FIGS. 5(a) and 5(b) illustrate an example graphical user interface for a user device 500 to enable access to information or content across multiple pages, in accordance with at least one embodiment. In this example, a computing device 500 is displaying a single page 502 in FIG. 5(a). Then, in FIG. 5(b), the device 500 is being tilted, has been flicked, or swiped to reveal multiple pages (502, 504, 506, 508, 510, 512) of the user's recently viewed items or history, which in this example includes pages for a plurality of different applications and/or services. Page 502 could be a social networking application, page 504 could be an Internet browser, page 506 could be a game, and so on. In another embodiment, the pages (504, 506, 508, 510, 512) could represent a discovery feature of the current page 502 or of the current dimension that the user is in. For example, the page 502 could be a music player application and a discovery feature of the device 500 could suggest content to the user associated with the musical artist currently playing by tilting or flicking the device in a particular direction. In this example, page 504 could be an information or fan page of the musical artist, page 506 could be an online music store for the user to purchase additional albums of the musical artist, page 508 could a page suggesting other artists similar to the current musical artist, and so on. Additionally, in this example, the hanging file folder example of FIGS. 3(a)-3(c) could be utilized to access a different application or dimension other than the page 502.

Figure 6:
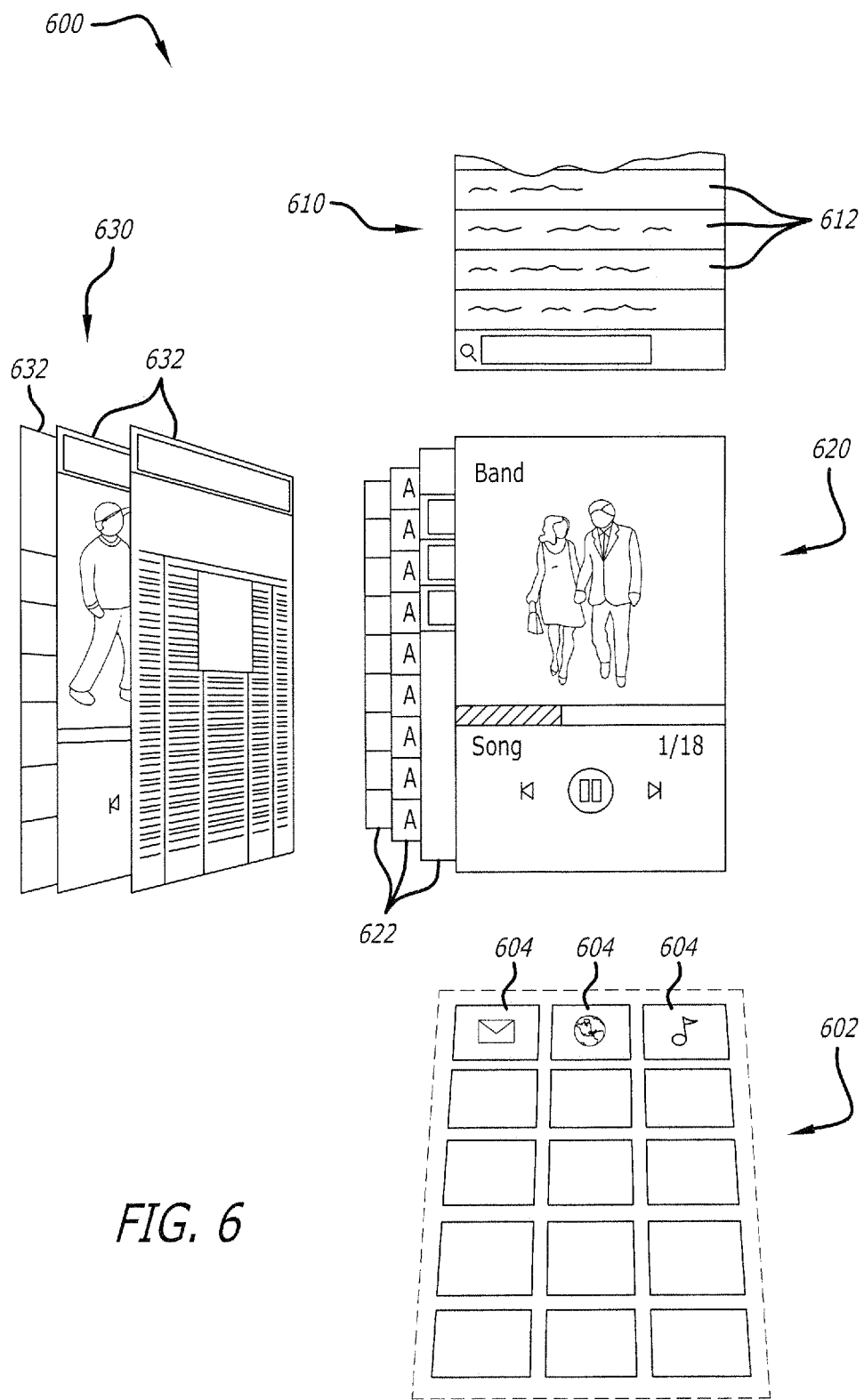
FIG. 6 illustrates another example operation of an interface that can be provided in accordance with at least one embodiment.

FIG. 6 illustrates an example content or navigation structure 600 for a portable computing device. The example structure 600 is an exploded view of an example illustration for how content could stack up or how it could be arranged for display within a device. Page 622(a), in this example, represents the page currently being displayed on a display screen of the device. Pages 622(b)-622(d), in this example, represent the discovery feature discussed with respect to FIG. 5 for suggesting additional content associated with a currently viewed application, dimension, or subject matter. Pages 632(a)-632(c), in this example, represent pages viewed in the past, application and dimensions recently engaged, or any other usage history 630. Page 602 is the home screen with a plurality of application icons 604, which may include an email application, camera application, photo album, music player application, calendar application, and so on. Page 610 represents a notification page with notifications 612 that may include news flashes, application updates, text messages, received emails, missed calls, or any other alert. Each one of the page types could be accessible by a flick, tilt, finger swipe, or a combination of the three to allow a user to navigate through the page structure 600. For example, a user currently viewing page 622(a) could swipe with one or more fingers downward on the screen to pull down the notification page 610 and swipe upward to return to the home page 604. The user could tilt the device to the right (left edge upward, right edge downward) to access application history 630 and tilt the device to the left (right edge upward, left edge downward) to access the discovery to learn more about and access additional features related to the content displayed on page 622(a). In addition, the user could flick the device forward (top edge downward, bottom edge upward) to see pages for multiple dimensions organized by letters of the alphabet of content titles as discussed with respect to FIGS. 4(a)-4(b) or to see multiple hanging folder pages as discussed with respect to FIG. 3(b). It should be understood that there can be additional, fewer, or alternative features in similar or alternative configurations with respect to page structure 600, within the scope of the various embodiments. In this example, the cumulative sum of the pages refers to the content and each individual page is a subset of that content.

Figure 7:
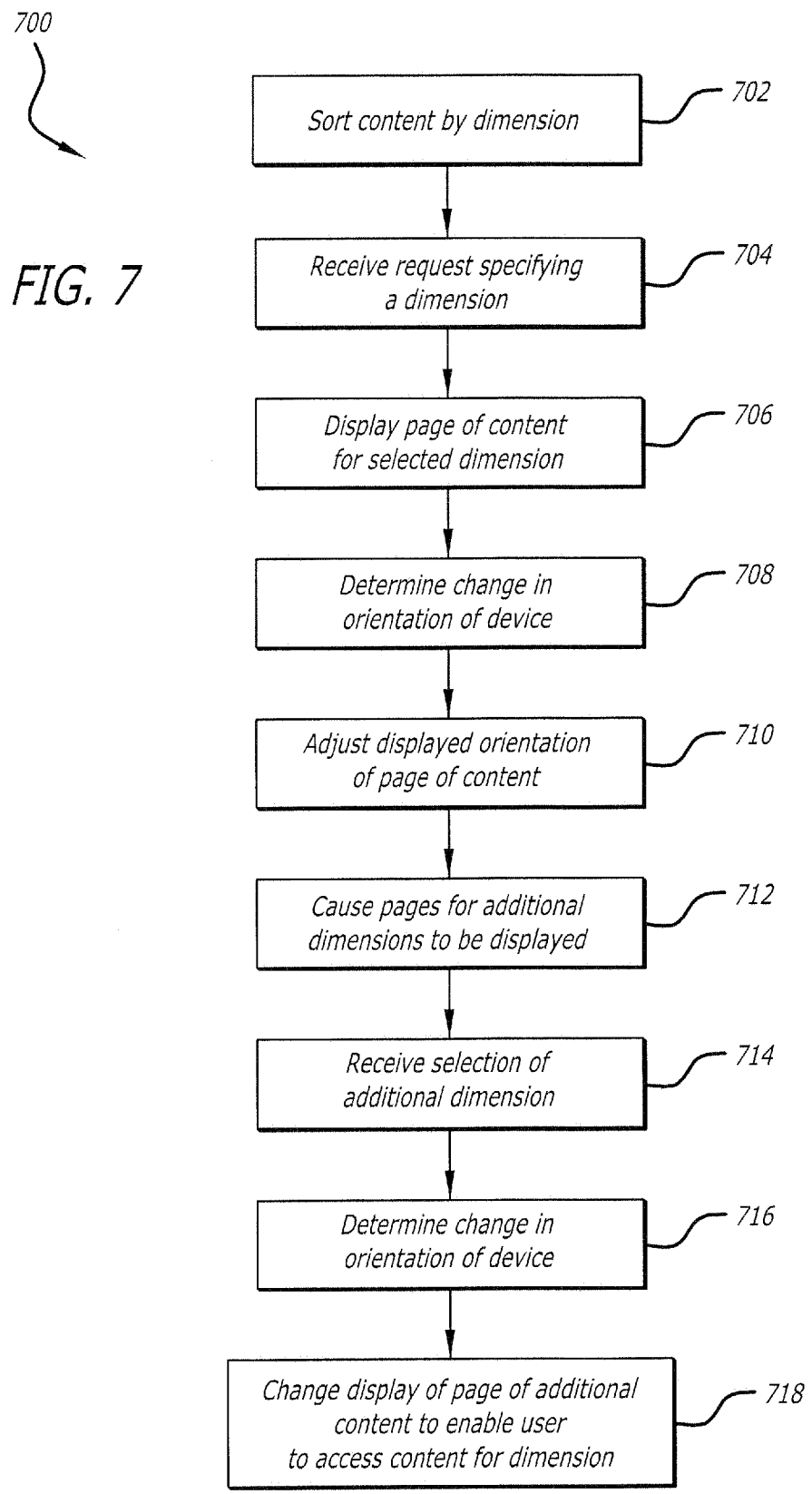
FIG. 7 illustrates an example process for displaying information along a selected dimension that can be used in accordance with at least one embodiment.

FIG. 7 illustrates an example process for displaying data across multiple dimensions that can be used in accordance with various embodiments. It should be understood that there can be additional, fewer, or alternative steps performed in similar or alternative orders, or in parallel, within the scope of the various embodiments unless otherwise stated. In this example, content is arranged among various dimensions or categories 702. In some embodiments, a user can specify one or more types of dimensions, and might associate certain content with certain dimensions. A device can receive a request from a user, application, or other such entity or component to provide a view of the data corresponding to a specific dimension 704. The device can determine content corresponding to that dimension or category, and cause that content to be displayed to the user 706. The device can then detect motion of the device 708, although other navigation approaches such as gesture control or sliding of slider bars can be used as well in some embodiment. Based at least in part upon the direction and/or amount of motion, the device can cause a page of content for a given dimension to adjust the displayed orientation as well 710, such that multiple dimensions are displayed concurrently 712. A selection of a dimension can be received from the user 714, and in response to an adjustment in the position of the device as determined by the device 716, the device can cause content for the selected dimension to be displayed to the user in a default or other such orientation 718.

Figure 8A:
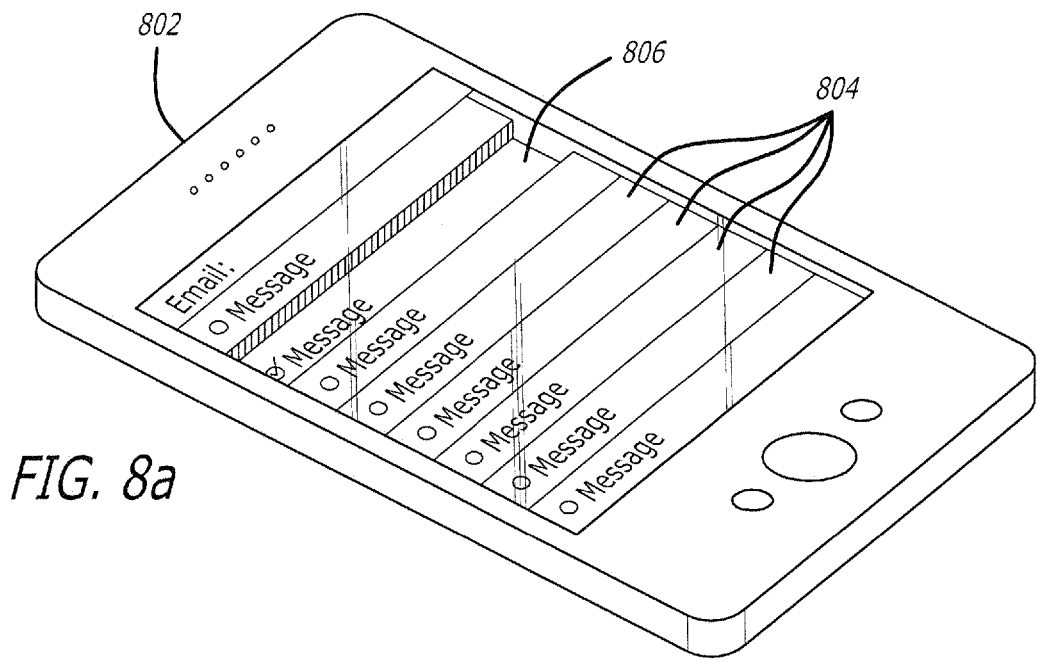
FIGS. 8(a) and 8(b) illustrate another example operation of an interface that can be provided in accordance with at least one embodiment.
Figure 8B:
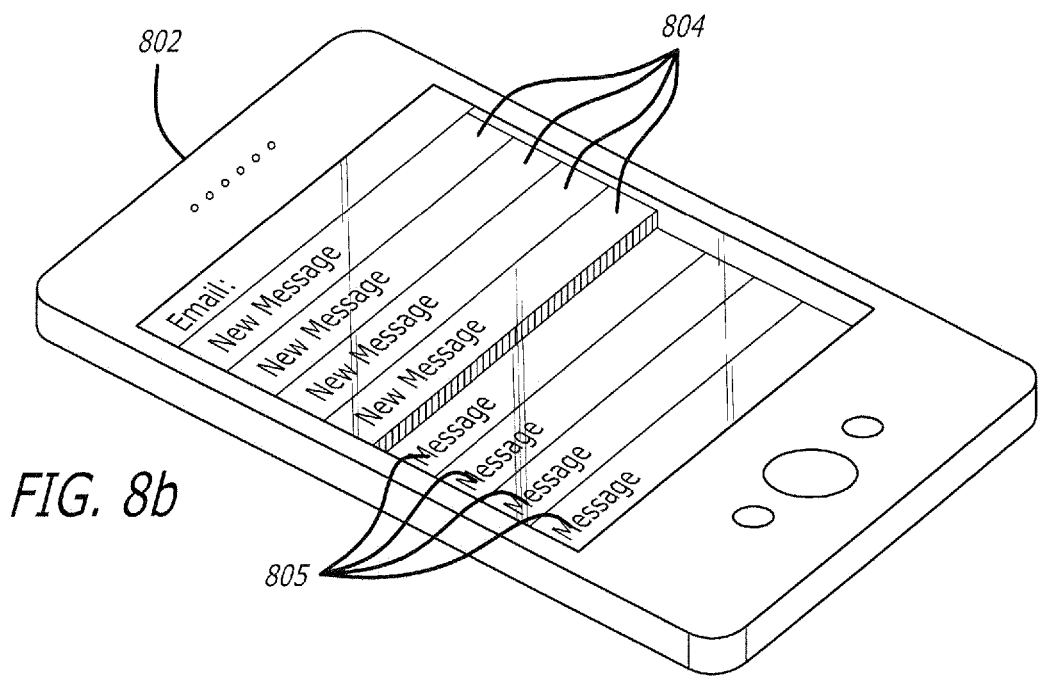

FIGS. 8(a)-8(c) illustrate an example portable computing device 802. FIG. 8(a) is an example of the device 802 showing an example email inbox having multiple emails 804 and an email 806 that is marked for deletion. In this example, the marked email 806 has been dropped to a lower level, depth, or z-index, which can cause the marked email 806 appear to be separated a distance from the top surface of the display relative to the unmarked emails 804. In one embodiment, the email display can be configured to allow a user to select and read an email with one finger and delete an email with two fingers. Two finger select and push to delete could have the appearance or feel of pushing the email down so that it disappears into z-space as in a free fall, for example. The user could also swipe, double tap, check a box and press a separate delete button, and so on. Similarly, FIG. 8(b) is another example of the device 802 showing an example email inbox with multiple unread emails 804 and multiple read emails 808. In this example, the read emails 808 appear on a lower z-index than the unread emails 804. Various other email inbox features could be initiated by a flick or tilt motion. For example, a flick/tilt could be used to reveal a delete button, one or more file folders for organizing emails, or other utilities associated with email functions. In one example, an inbox may display the email senders name and a subject; then, when a user flicks the device 802 to the right, for example, the emails could shifts to the right revealing multiple check boxes. The user could then select one or more emails by checking one or more boxes to delete or organize the emails in folders, for example. In one example, check boxes for an email inbox could be hidden off screen and be revealed by a flick/tilt.

The flick and tilt functionality could be associated with other content of the portable computing device as well. For example, head tracking may be utilized when a user is viewing a screen head-on to display content or dimension A, such as the time, weather, music player, or any other utility or data type in a status bar of the device. The user could then tilt the device at an obtuse angle, for example, relative to a head position of the user to change the content to display content or dimension B, such as the status of the battery, Wi-Fi signal strength, and so on. Such a feature would extend the real estate of the status bar so a user can have access to more views by changing a position of the device. In one example, a user watching a video could tilt the device to reveal a play back display to view where in time a particular scene is in the video. In other embodiments, head tracking may be utilized to create the appearance of a holographic display. A holographic display could be implemented by including multiple images where the images, via a camera facing the user, track a user's head as it moves around various locations of the display or UI to create the appearance or illusion of a hologram.

In order to further enhance the intuitive nature of such an interface, an application associated with the interface can accept motion commands from a user as input to the interface. For example, if a user wants to rotate an axis in a three-dimensional representation then the user can perform an action such as to rotate or tilt the device. If the device has a camera with image recognition, the user can perform a motion such as to swipe a hand in the intended direction, make an appropriate head motion, perform a specified action, etc. Various other types of input can be used as well, such as voice or image input.

Figure 9A:
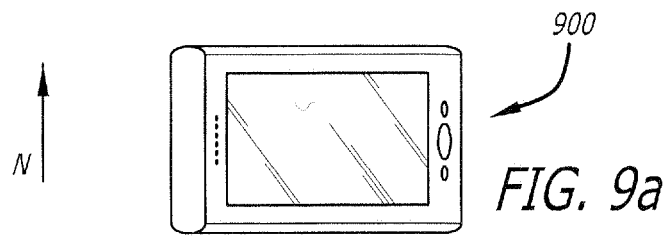
FIGS. 9(a)-9(e) illustrate example motions of a portable device that can be used to provide input to various interfaces described herein.
Figure 9B:
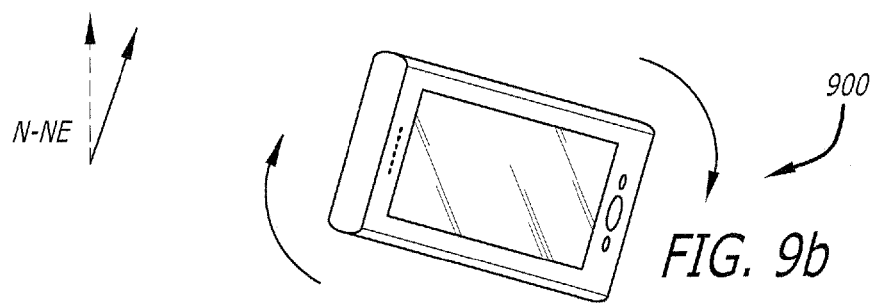
Figures 9C, 9D:
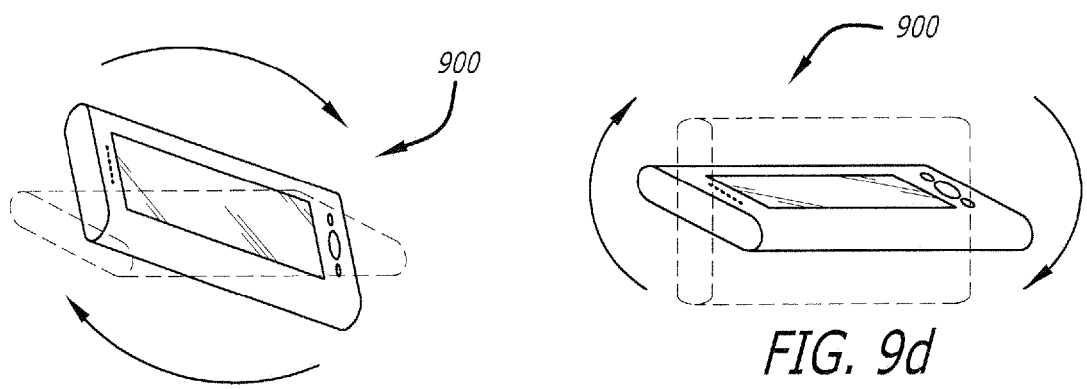
Figure 9E:
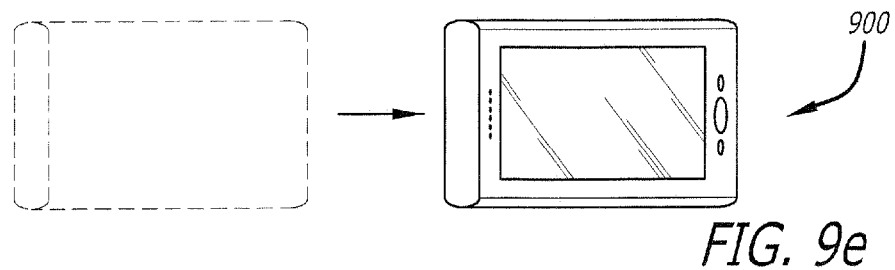

As discussed above, a portable device can include at least one orientation and/or location determining element, such as an accelerometer, electronic compass, or gyroscope. FIGS. 9(a)-9(e) illustrate example types of information that can be obtained using location and/or orientation determining elements of an example device 900 in accordance with various embodiments. As discussed, such information can be used to provide input to a portable device, which can be used to adjust various aspects of an interface display. For example, FIG. 9(a) illustrates that the device is facing substantially north (according to a selected or defined axis of the device), while FIG. 9(b) illustrates that the device has been adjusted in direction such that the device is now facing in a north-northeast direction. The change in direction, as well as the number of degrees or other measurement of the change, can be determined using an element such as an electronic compass. FIGS. 9(c) and 9(d) illustrate changes in orientation (e.g., tilted to the side and back, respectively) that do not change the direction and thus would might be picked up as a direction change by a compass. Such changes in orientation can be picked up by an orientation determining element such as an accelerometer or gyroscope. FIG. 9(e) illustrates a change in the position of the device. While such motion can be picked up by an element such as an accelerometer, an element such as a GPS device can give more accurate and/or precise location information for a current position of the device in at least some situations. Various other types of elements can be used as well to obtain any of these and other changes in orientation and/or location.

In addition to applications, other entities or modules such as Web sites or electronic marketplaces can be configured or programmed to utilize such information as well. In some embodiments, an electronic marketplace might not display information through a conventional Web page in a browser, but might provide information to a device that can be displayed along one or more dimensions of a multi-dimensional interface and can be sorted and modified just as any data stored on the device. For example, a shopping view might show dimensions such as past purchases, browse history, reviews, wish list items, etc. A user can select such a view and navigate to content of interest using approaches discussed and suggested herein. Further, since the data can be associated with other data dimensions, the user can obtain information that would not previously have been readily determinable. For example, if a product on the marketplace was reviewed by a reviewer that the user recognizes, but cannot remember where the user met that reviewer, the user can change the view to combine contacts, location, or other such dimensions with the shopping dimension to locate the information.

Various embodiments of the present disclosure may additionally utilize head tracking. For devices that render content based at least in part upon a current viewpoint or perspective of the user, based at least in part upon the determined relative position of the user's head, such approaches enable content to be rendered with the appropriate perspective even when the user's head is not within the field of view of an active camera element or other such component. In some embodiments, the content can be rendered with a three-dimensional (3D) effect in the proper perspective over a wide range of viewing angles or perspectives, throughout which the user will have a clear view of the display.

One or more cameras can be used to track the relative head position of a user in order to assist in generating a perspective-appropriate "three-dimensional" image on a display screen of the device. Changes in the relative position of the user's head can result from motion of the user or the device, or a combination of both. One or more sensors such as an electronic gyroscope or accelerometer can be used to track motion of the device. When the user moves out of the field of view of a camera that is tracking the head position, the sensors can provide information about the movement of the device to enable estimation of the current position of the user's head with respect to the device, as may be due to a rotation, tilting, or translation of the device.

A device can instead (or additionally) monitor the captured image information to attempt to determine motion through changes in position of objects in the background. For example, a rotation or translation of the device can be determined by monitoring changes of the position of background objects captured in images captured at different points in time. Such information can also help to determine the relative position of the user's head during or after the motion, which may not be able to be obtained by relying only on a sensor such as a gyroscope. For example, the user might rotate the user's entire body, instead of just the device, which might cause the user's head to be in approximately the same relative position with respect to the device, even though the device underwent a significant amount of motion.

A device may utilize a relative position of one or more light sources to attempt to determine device motion. For example, when the device is outside on a sunny day the device might be able to use a shadow sensor or other such element to determine the relative position of the sun. By tracking that relative position over time, the device can determine changes in orientation of the device.

A prediction algorithm used to estimate relative head position based on sensor data or other such information can also take into account various limitations of the human body when predicting the relative position of a user's head with respect to a device. For example, if a user is leaning all the way to the right and the user then disappears from the field of view, it can be assumed that the device was rotated (unless the user got up or performed another such motion) as the user is already leaning as far as the user is able to lean. Similarly, if the user tilts his or her head as far as it can go, it can be assumed that any additional motion causing the user to move out of the field of view of the camera is a result of motion of the device.

In at least some embodiments, a device can utilize two or more of these approaches to attempt to track the relative position of a user to a computing device. In some embodiments, at least one imaging approach can be utilized with at least one motion determining approach. For example, a video capture and analysis process can be used with an electronic gyroscope and accelerometer-based motion determination approach, or can be used with a background object or light source tracking process. In some embodiments the approaches used at any given time can depend on one or more environmental factors, such as an amount of ambient light, the presence of point light sources nearby, and other such factors.

In some embodiments, a tracking algorithm executing on the device (or at least in communication with the device) can analyze sensor information when a user's head starts disappearing, for example, in order to attempt to determine why the head is disappearing. If the sensor data indicates that the device is not moving or rotating, for example, that information can be used to infer that the user is leaving. In such a situation, the device might not do any processing or updating of perspective, etc. If, instead, a strong gyroscope signal or other such input is obtained indicating a significant amount of device motion, which implies that the user is tilting the phone, the device can utilize an approach to attempt to render the images using an appropriate perspective. As mentioned, in some embodiments changes in perspective are only rendered up to a certain angle of perspective, as beyond that angle very little of the screen can be seen anyway. Any time the head is not seen in the image information there can be a basic assumption that the head will not move significantly, such that the rendering perspective will be relatively accurate based at least upon device movement or other such information. While such assumptions can provide a source of potential error, in general users can be more likely to tilt a device than significantly move or tilt the user's head to view content on the device, such that the error in many cases can be of an acceptable range. In many cases, a user at least will be less likely to move his or her head significantly while also moving the device. Various other assumptions can be relied upon as well in various prediction algorithms.

As mentioned, a device can utilize at least two perspective determinations in at least some embodiments to improve the accuracy of those determinations. As the user's head position begins to fall outside the field of view of the device, or when the relative position can no longer be determined with an acceptable degree of confidence using a visual detection approach, a weighting of an inertial- or sensor-based method can be increased that is able to at least accurately determine the motion of the device. As discussed, once the head position can no longer be captured by a camera of the device then a determination algorithm might have to assume that the head is remaining substantially stationary, is following a previous trajectory or type of motion, etc. If the device was not moving but the head is no longer visible, the device might not attempt to update the rendering of content until the head position can again be determined with a level of accuracy, at which point the perspective can be updated as appropriate. In at least some embodiments head tracking will stop when the user walks away in order to conserve resources, and the tracking might not start again until a certain event occurs, such as the user picking up the device, motion being detected near the device, etc. When the user's head is again within the field of view, the device can update the perspective rendering information accordingly. If the estimates of relative position were off such that there needs to be a substantial updating of the rendering, the device can relatively slowly update the rendering instead of causing the image information to jerk, jump, or otherwise rapidly change to the proper perspective, which might negatively impact the user experience.

Various other types of information can be used to improve the accuracy of perspective determinations within the scope of the various embodiments. For example, a device can utilize audio beamforming to attempt to track the relative orientation of a device with respect to a source of sound, somewhat similar in nature to the light source approach discussed above. Any shift in the relative position of a source of noise, ambient or other, can be indicative of movement of the device. Other information can be used as well, such as detection of the user holding, contacting, or squeezing the device, making a motion or gesture within a field of view of the device, or performing another such action that is indicative of the user being near the device and/or within a specific area with respect to the device.

When using a sensor such as a gyroscope to determine motion, the gyroscope signal can be sampled much faster than the video or image capture frame rate. In some embodiments, an element such as a Kalman filter can be used to synchronize, extrapolate, and subtract the predicted rotational signal from the optical flow between successive frames. Such an approach can utilize control over different levels of operating system software, as well as hardware components, to minimize delays and predict changes in synchronization with high accuracy.

In at least some embodiments, a component such as an electronic gyroscope can provide a velocity of rotation about three axes. When the velocity is compared against the amount of elapsed time, an amount of rotation can be determined. Thus, in at least some embodiments each gyroscope reading has an associated timestamp. With a relatively high frequency of determination, a rotation angle for a period of time can be determined with relative accuracy. The rotation angle can be thought of as the optical flow, which as illustrated does not depend largely on distance to a particular object as everything is expressed in degrees of rotation. Knowing the field of view of the camera enables conversion between pixels and degrees (i.e., a camera of 100 pixels with a 50 degree field of view will have a 0.5 degree per pixel value).

Figure 10:
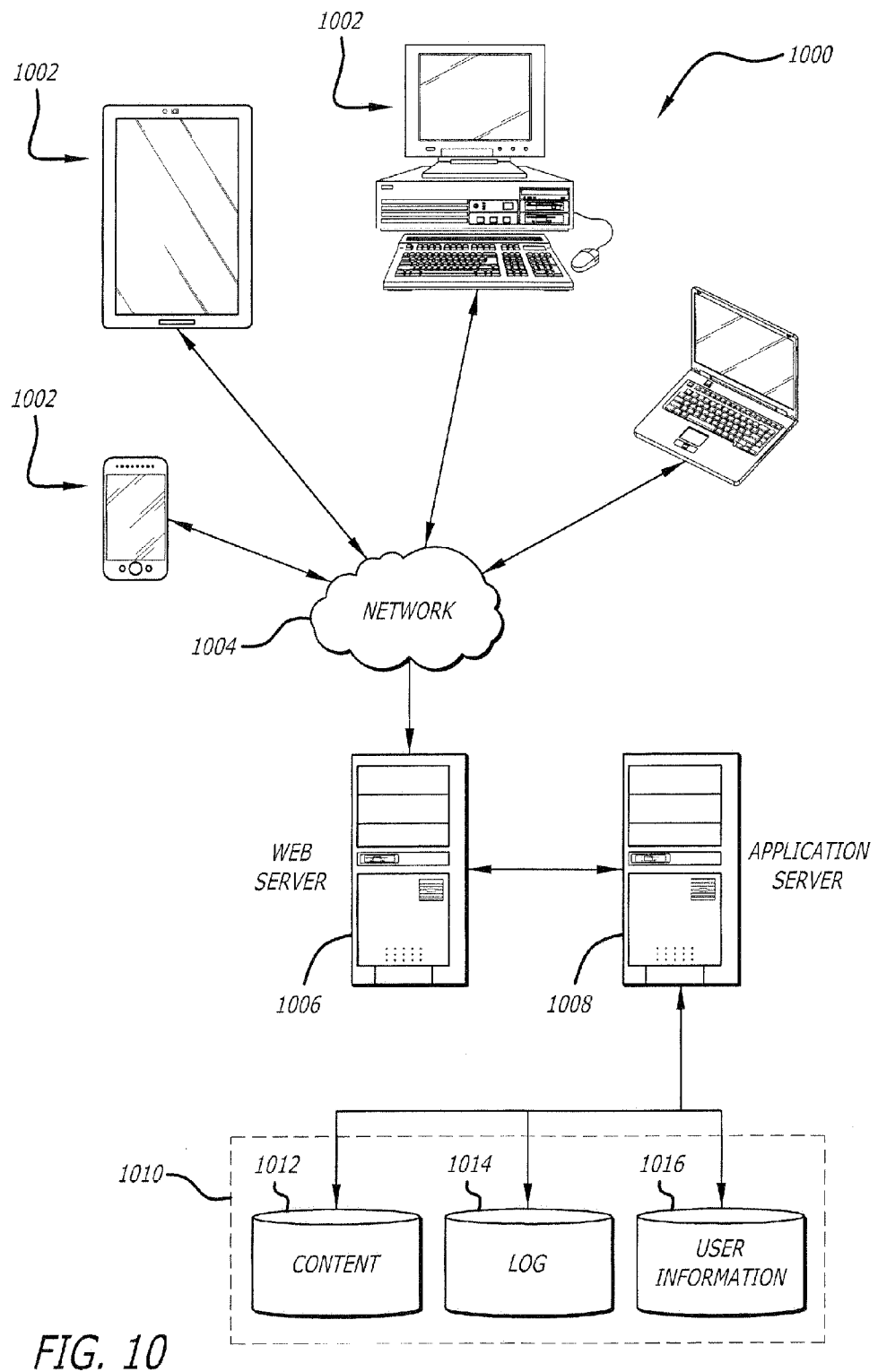
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
displaying, on an interface of a portable computing device,
a first section and at least a portion of a second section of a plurality of sections of a single page,
the first section and the second section including a plurality of application icons categorically organized by type,
the first section including a first portion of the plurality of application icons;
the second section including a second portion of the plurality of application icons;
detecting a first rotation of the portable computing device about a determined axis;
in response to detecting the first rotation, animating a collapse of the first section and the portion of the second section to display a plurality of section titles associated with the respective section including a first section title corresponding with the first section, a second section title corresponding with the second section in a collapsed view, and a third section title corresponding with a third section of the plurality of application icons;
receiving a first selection of the third section title of the plurality of section titles;
in response to the first selection, animating an expansion of the third section to display a respective portion of the plurality of application icons corresponding to the third section;
receiving a second selection;
in response to the second selection, detecting a second rotation of the portable computing device about the determined axis; and
in response to detecting the second rotation, enabling navigation within the plurality of application icons corresponding to the third section.

2. The computer-implemented method of claim 1, wherein the collapse includes at least a portion of the first section translating or rotating in a determined direction with respect to the interface of the portable computing device.

3. The computer-implemented method of claim 1, wherein the interface is provided through a touch screen display and wherein the first selection is provided through contact with the third section title for the third section displayed on the touch screen display in the collapsed view.

4. A computer-implemented method, comprising:
under the control of one or more computer systems configured with executable instructions,
displaying, on an interface of a computing device, a first subset of content and at least a portion of a second subset of the content;
detecting a first rotation change in orientation of the computing device about a determined axis;
in response to detecting the first rotation change in orientation, displaying a set of section titles and changing the display of the first subset of the content and the at least a portion of the second subset of the content, the set of section titles associated with the respective content, the set of section titles including a first section title of a first page and a second section title of a second page, the first section title being associated with the first subset of the content and the second section title being associated with the second subset of the content;

detecting a second selection action of the first section title;

in response to detecting the second selection action, displaying the first subset of the content and changing the display of the first section title;

subsequently detecting a second rotation of the computing device about the determined axis; and in response to detecting the second rotation, activating a navigation feature.

5. The computer-implemented method of claim 4, wherein the first rotation change in orientation corresponds to a tilt or a flick of the computing device in a determined direction for at least one of a minimum amount of time or a minimum amount of change in orientation.

6. The computer-implemented method of claim 4, wherein the first rotation change in orientation is determined using at least one of an accelerometer, a gyroscope, or image information captured using at least one camera of the computing device.

7. The computer-implemented method of claim 4, wherein at least one of the first subset of the content or the second subset of the content includes a plurality of application icons.

8. The computer-implemented method of claim 7, wherein the first section title and the second section title are arranged by content type.

9. A computing device, comprising:
a display screen;
a processor; and
a memory device including instructions that, when executed by the processor, cause the computing device to:
display, on the display screen, a first subset of content and at least a portion of a second subset of the content on a page;
detect a first rotation of the computing device about a determined axis;
in response to detecting the first rotation, display a set of section titles associated with respective content and change the first subset of the content and the portion of the second subset of the content, the set of section titles including a first section title of a first page and a second section title of a second page, the first section title being associated with the first subset of content and the second section title being associated with the second subset of the content;
detect a second selection action of the second section title;
in response to detecting the second selection action, display the second subset of the content and change the display of the second section title;
subsequently detect a second rotation of the computing device about the determined axis; and
in response to detecting the second rotation, activate a navigation feature.

10. The computing device of claim 9, wherein the display screen is provided through a touch screen display and wherein the second selection action is provided through contact with the second section title on the touch screen display.

11. The computing device of claim 9, wherein the first rotation is detected using at least one of an accelerometer, a gyroscope, or image information captured using at least one camera of the computing device.

12. A non-transitory computer-readable medium including instructions for displaying content, the instructions when executed by a processor of a portable computing device causing the portable computing device to:
display, on a display screen, a first subset of content and at least a portion of a second subset of the content on a page;
detect a first rotation about a determined axis;
in response to detecting the first rotation, display a set of section titles associated with respective content and change the display of the first subset of the content and the portion of the second subset of the content, the set of section titles including a first section title of a first page and a second section title of a second page, the first section title being associated with the first subset of the content and the second section title being associated with the second subset of the content;
detecting a second selection action of the first section title;
in response to detecting the second selection action, display the first subset of the content and change the display of the first section title;
subsequently detecting a second rotation of the portable computing device about the determined axis; and
in response to detecting the second rotation, activating a navigation feature.

13. The non-transitory computer-readable medium of claim 12, wherein the instructions when executed further cause the portable computing device to:
receive a first selection for the second section title; and
display the second subset of the content on the display screen of the portable computing device.

14. The non-transitory computer-readable medium of claim 12, wherein the instructions when executed further cause the portable computing device to:
receiving a first selection for the second section title;
detect a third rotation of the portable computing device, the third rotation being substantially opposite to a determined direction of the first rotation; and
in response to detecting the third rotation, display the second subset of the content on the display screen.

15. The non-transitory computer-readable medium of claim 12, wherein the first rotation corresponds to a tilt or a flick of the portable computing device in a determined direction for at least one of a minimum amount of time or a minimum amount of change in orientation and wherein the first rotation is detected using at least one of an accelerometer, a gyroscope, or image information captured using at least one camera of the portable computing device.

16. The non-transitory computer-readable medium of claim 12, wherein the first subset of the content and the second subset of the content is provided on a page organized by category.

17. The non-transitory computer-readable medium of claim 16, wherein the instructions when executed further cause the portable computing device to:
in response to detecting the first rotation, animating a collapse of the page to display at least the first section title and the second section title.

18. The non-transitory computer-readable medium of claim 17, wherein the collapse of the page includes at least a portion of the first subset of the content or the second subset of the content translating or rotating in a determined direction with respect to the display screen of the portable computing device.

* * * * *